(12) United States Patent
Ojanperä et al.

(10) Patent No.: US 11,859,911 B2
(45) Date of Patent: Jan. 2, 2024

(54) COAXIAL HEAT TRANSFER TUBE SUITABLE FOR A FLUIDIZED BED BOILER AND A METHOD FOR MANUFACTURING SAME

(71) Applicant: Valmet Technologies Oy, Espoo (FI)

(72) Inventors: Juha Ojanperä, Pirkkala (FI); Harri Yli-Rantala, Hellanmaa (FI)

(73) Assignee: VALMET TECHNOLOGIES OY, Espoo (FI)

( * ) Notice: Subject to any disclaimer, the term of this patent is extended or adjusted under 35 U.S.C. 154(b) by 315 days.

(21) Appl. No.: 17/049,190

(22) PCT Filed: May 9, 2019

(86) PCT No.: PCT/FI2019/050362
§ 371 (c)(1),
(2) Date: Oct. 20, 2020

(87) PCT Pub. No.: WO2019/224423
PCT Pub. Date: Nov. 28, 2019

(65) Prior Publication Data
US 2021/0239400 A1    Aug. 5, 2021

(30) Foreign Application Priority Data
May 21, 2018    (FI) .................................... 20185465

(51) Int. Cl.
*F16L 59/22* (2006.01)
*F28D 1/047* (2006.01)
*F22B 37/10* (2006.01)

(52) U.S. Cl.
CPC ............ *F28D 1/0477* (2013.01); *F16L 59/22* (2013.01); *F22B 37/108* (2013.01)

(58) Field of Classification Search
CPC .............................. F28D 1/0477; F16L 59/22
See application file for complete search history.

(56) References Cited

U.S. PATENT DOCUMENTS 1,331,429 A    2/1920   Hartman
2,962,051 A *  11/1960  Burkes, Jr. .............. F16L 59/14
                                                    285/47
(Continued)

FOREIGN PATENT DOCUMENTS

CN    208735736 U  *  4/2019
EP    2505902 A2     10/2012
(Continued)

OTHER PUBLICATIONS

Estimated Young's Modulus of Ruberized Mortar (Year: 2016).*
(Continued)

*Primary Examiner* — Gregory A Wilson
(74) *Attorney, Agent, or Firm* — Alston & Bird LLP

(57) ABSTRACT

A coaxial heat transfer tube (100), comprising a first inner heat transfer tube (110) having straight parts (111, 113, 115, 117) and curved parts (112, 114, 116), a first outer heat transfer tube (120) having straight parts (121, 123, 125, 127) and curved parts (122, 124, 126). The first outer heat transfer tube (120) radially surrounds the first inner heat transfer tube (110) at least within the first primary straight part (121) and the first primary curved part (122). Thermally insulating material (530) has been provided in between a curved part (122) of the first outer heat transfer tube (120) and a curved part (112) of the first inner heat transfer tube (110). Neither straight part (121) nor a curved part (122) of the first outer heat transfer tube (120) comprises a longitudinal seam. A method for making a coaxial heat transfer tube (100).

6 Claims, 9 Drawing Sheets

(56) References Cited

U.S. PATENT DOCUMENTS

| | | | | |
|---|---|---|---|---|
| 3,253,326 A | * | 5/1966 | Henry | B21D 7/00 |
| | | | | 29/445 |
| 3,343,250 A | | 9/1967 | Berto et al. | |
| 3,351,361 A | | 11/1967 | Martin | |
| 3,453,840 A | * | 7/1969 | Iyoshi | F28F 1/06 |
| | | | | 62/515 |
| 4,205,420 A | * | 6/1980 | Bothwell | F16L 59/147 |
| | | | | 29/445 |
| 5,724,923 A | * | 3/1998 | Green | F22B 37/107 |
| | | | | 122/DIG. 13 |
| 5,881,802 A | | 3/1999 | Green | |
| 7,037,557 B2 | * | 5/2006 | Keyes | F16L 59/143 |
| | | | | 427/247 |
| 9,371,987 B2 | | 6/2016 | Petanen et al. | |
| 10,429,064 B2 | * | 10/2019 | Chiu | F23C 10/002 |
| 10,890,323 B2 | | 1/2021 | Lehtonen | F28D 13/00 |
| 2005/0265908 A1 | * | 12/2005 | Boe | F28D 7/106 |
| | | | | 422/198 |
| 2008/0121304 A1 | * | 5/2008 | Carlier | F16L 59/065 |
| | | | | 141/8 |
| 2010/0000474 A1 | * | 1/2010 | Petanen | F22B 37/107 |
| | | | | 122/367.1 |
| 2011/0219814 A1 | | 9/2011 | Seryi et al. | |
| 2015/0075247 A1 | * | 3/2015 | Shaska | B21D 7/028 |
| | | | | 72/369 |
| 2016/0258692 A1 | * | 9/2016 | Kainu | F22B 31/0007 |

FOREIGN PATENT DOCUMENTS

| | | |
|---|---|---|
| FI | 126903 B | 7/2017 |
| GB | 894883 A | 4/1962 |
| JP | S39-025480 B | 11/1939 |
| JP | S59-024519 A | 2/1984 |
| JP | S63-58096 A | 3/1988 |
| JP | H08-226601 A | 9/1996 |
| WO | WO-2013/121965 A1 | 8/2013 |
| WO | WO-2018/083367 A1 | 5/2018 |

OTHER PUBLICATIONS

Finnish Patent and Registration Office, Office Action for Finnish Application No. 20185465, dated Dec. 21, 2018, (10 pages), Tampere, Finland.

International Searching Authority, International Search Report and Written Opinion for International Application No. PCT/FI2019/050362, dated Jul. 16, 2019, (14 pages), Rijswijk, Netherlands.

Office Action for Chinese patent Application No. 201980033301.5, dated Feb. 14, 2022, (9 pages), China National Intellectual Property Administration, Beijing City, China.

* cited by examiner

COAXIAL HEAT TRANSFER TUBE SUITABLE FOR A FLUIDIZED BED BOILER AND A METHOD FOR MANUFACTURING SAME

CROSS REFERENCE TO RELATED APPLICATIONS

This application is a National Stage Application, filed under 35 U.S.C. 371, of International Application No. PCT/FI2019/050362, filed May 9, 2019, which international application claims priority to and the benefit of Finland Application No. 20185465, filed May 21, 2018; the contents of both of which as are hereby incorporated by reference in their entireties.

BACKGROUND

Related Field

The invention relates to methods for manufacturing heat exchanger tubes. The invention relates to heat transfer tubes for heat exchangers particularly suitable for fluidized bed boilers. The invention relates to heat transfer tubes for heat exchangers suitable for circulating fluidized bed boilers. The invention relates to fluidized bed heat exchangers. The invention relates to a heat exchanger for a loopseal of a circulating fluidized bed boiler. The invention relates to particle coolers.

Description of Related Art

Protected heat transfer tubes are known from U.S. Pat. Nos. 3,351,361 and 5,881,802. A fluidized bed heat exchanger having a protected heat transfer tube is known from U.S. Pat. No. 9,371,987. The fluidized bed heat exchanger may be arranged in connection with a boiler, i.e. a steam generator, to recover heat from the bed material of the fluidized bed. Typically in such a heat exchanger steam becomes superheated, whereby such a fluidized bed heat exchanger may be referred to as a fluidized bed superheater. In a bubbling fluidized bed boiler, a fluidized bed heat exchanger may be arranged in the fluidized bed of a furnace. In a circulating fluidized bed boiler, a fluidized bed heat exchanger may be arranged in the loopseal. In such a case the heat exchanger may be referred to as a loopseal heat exchanger or a loopseal superheater.

From the aforementioned publications it is known to protect a heat transfer tube of a heat exchanger in corrosive environments. A heat transfer tube of prior art comprises straight parts. In the straight parts, an inner heat transfer tube has been protected by an outer refractory. However, different protection is used in curved parts of the tube, when the tube is bent. For example, in U.S. Pat. No. 9,371,987 (FIG. 4), the curved parts have been protected by arranging them in a space isolated from the fluidized bed. In such an arrangement, heat transfer from the fluidized bed to the heat exchange medium within the heat exchanger tubes is not optimal, because heat is not transferred through the curved parts of the tubes. Shields formed of multiple parts could be used to provide a shield also to curved parts However, such a shield would be formed from several parts, which would have to be attached to each other. Such an attachment complicates the manufacturing process. As an evidence of the shield having been made from two parts, such a shield comprises two longitudinal seams.

BRIEF SUMMARY

To address these issues, it has been found that the curved parts of the inner heat transfer tubes can be protected by an outer tube, or subsequent pieces of outer tubes welded together, wherein the outer tube (or the pieces) are made from only one tubular piece of material. Correspondingly, the outer tube is free from a longitudinal seam. When protected in such a way, also the curved parts of the outer heat transfer tube can be arranged in contact with heat transfer material outside of the tube, in particular bed material. This has been found to improve the heat transfer of the heat exchanger.

Such a tube, i.e. a coaxial tube, can be manufactured by arranging an inner tube into an outer tube and bending the tubes. However, for a proper use as a superheater, a distance between the inner and outer tubes should be proper. To control this distance also during bending the tubes (i.e. a coaxial tube formed by the tubes), hardenable thermally insulating material is injected in between the tubes and hardened before bending the tubes. When hardened, the hardened thermally insulating material keeps the distance between the tubes at a proper range also during bending. Correspondingly a coaxial tube comprises hardened thermally insulating material in between the inner tube and the outer tube.

In an embodiment, a spacer arrangement has been provided to centre the tubes relative to each other. This help to keep the temperature of the surface of the outer tube at a suitable temperature level in view of corrosion of the environment. Preferably, the spacer arrangement comprises protrusions on an inner surface of the outer tube.

The invention is more specifically disclosed in the independent claims. The dependent claims and the description below disclose embodiments, of which some are preferred.

BRIEF DESCRIPTION OF THE FIGURES

FIG. 6a shows the sectional view VIa-VIa of the coaxial heat transfer tubes of FIG. 4a, and FIG. 6b shows the sectional view VIb-VIb of the coaxial heat transfer tube of FIG. 4a.

To illustrate different views of the embodiments, three orthogonal directions Sx, Sy, and Sz are indicated in the figures. In use, the direction Sz is substantially vertical and upwards. In this way, the direction Sz is substantially reverse to gravity.

DETAILED DESCRIPTION OF VARIOUS EMBODIMENTS

Figure 1A:
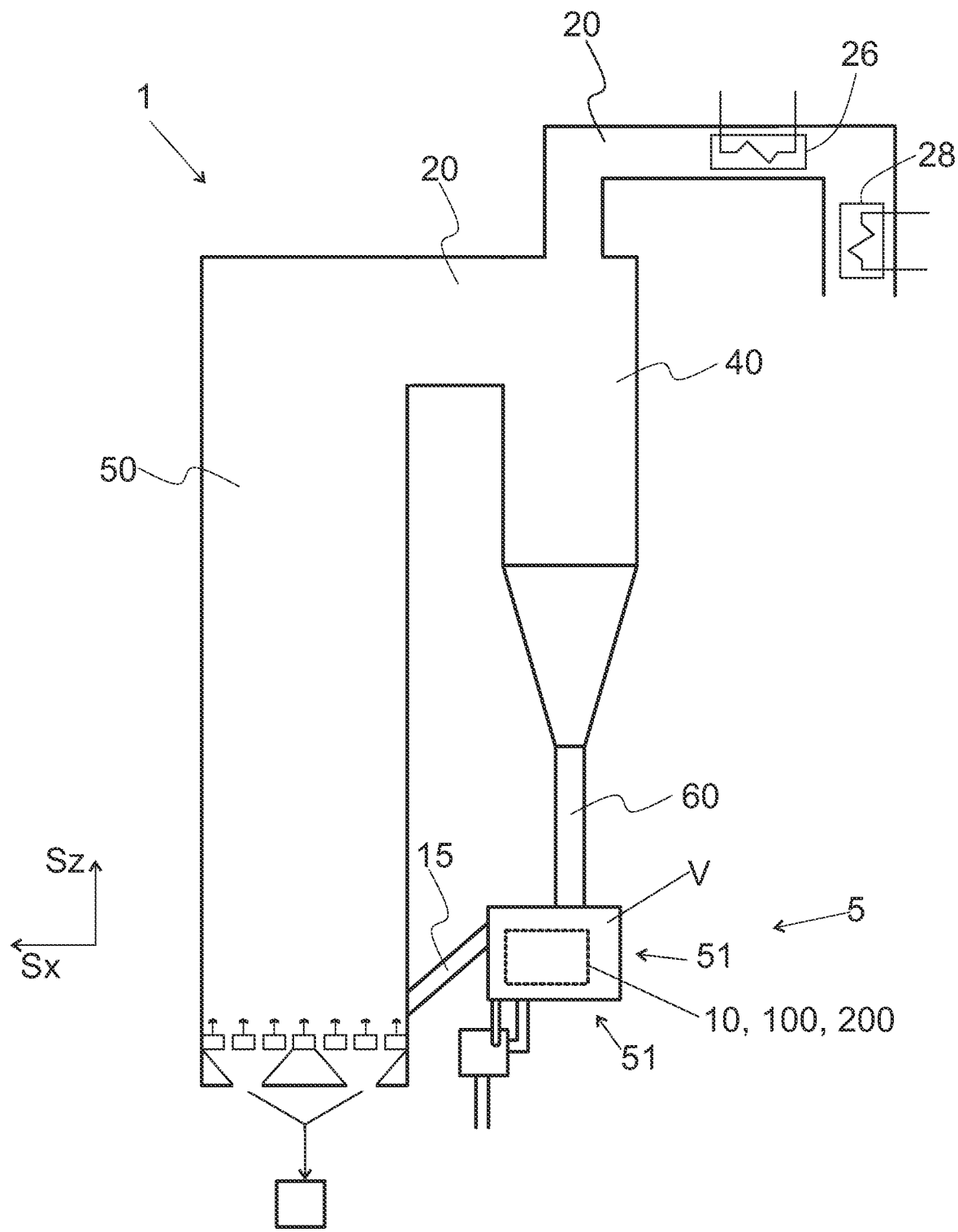
FIG. 1a shows a circulating fluidized bed boiler in a side view.
Figure 1B:
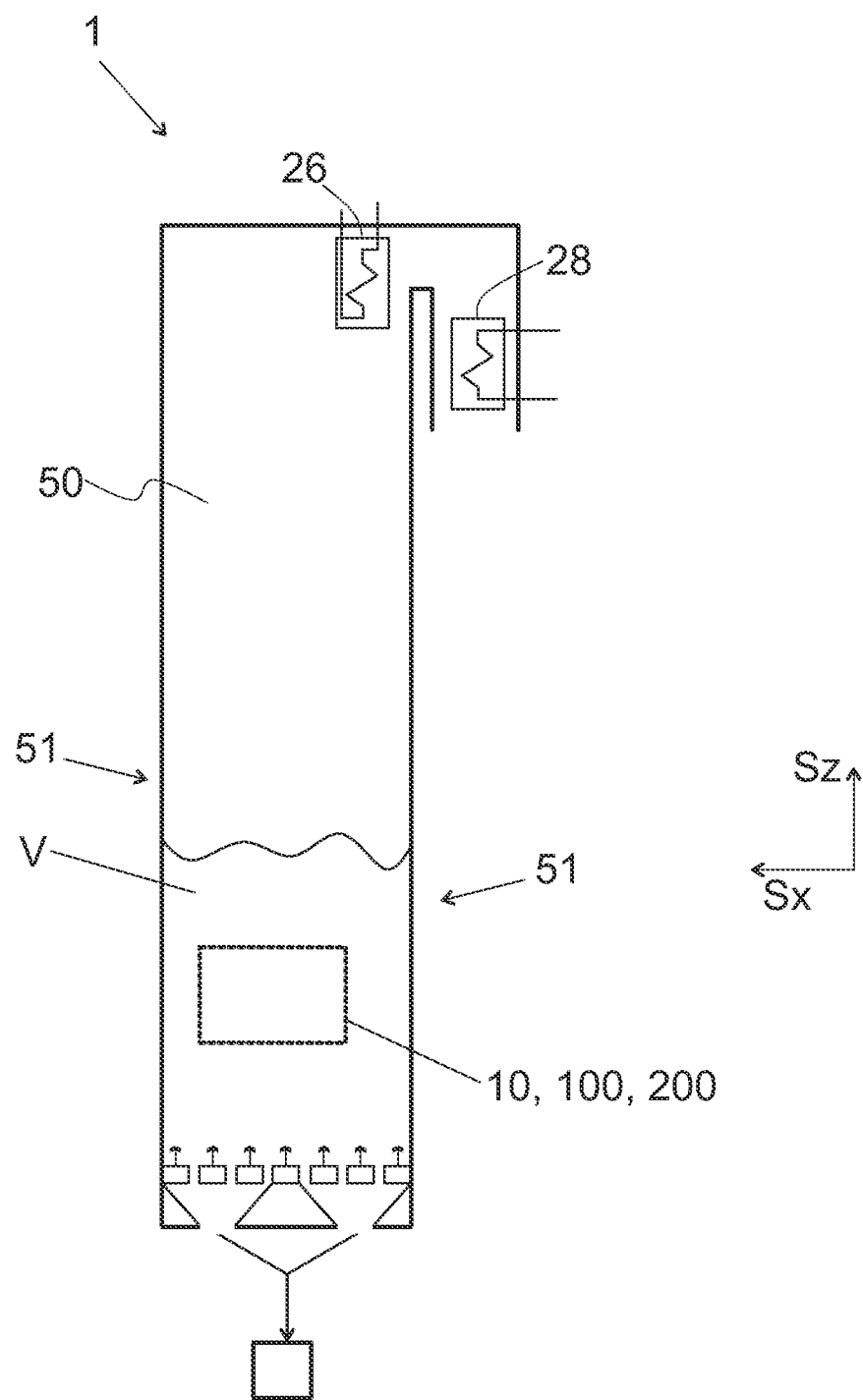
FIG. 1b shows a bubbling fluidized bed boiler in a side view.

FIG. 1 a shows a circulating fluidized bed boiler 1 in a side view. The circulating fluidized bed boiler 1 comprises a furnace 50, a cyclone 40, which is a means 40 for separating bed material from flue gas, and a loopseal 5. the loopseal 5 is configured to receive bed material from the cyclone 40. In FIG. 1a, a flue gas channel is indicated by the reference number 20. Flue gas is expelled from the furnace 50 via the flue gas channel 20. FIG. 1b shows a bubbling fluidized bed boiler 1 in a side view. The bubbling fluidized bed boiler 1 comprises a furnace 50 and a flue gas channel 20.

Typically, the fluidized bed boiler 1 (bubbling or circulating) comprises flue gas heat exchangers 26, 28 within the flue gas channel 20. The flue gas heat exchangers 26, 28 are configured to recover heat from flue gases. Some of the flue gas heat exchangers may be superheaters 26 configured to superheat steam by recovering heat from flue gas. Some of the heat exchangers may be economizers 28 configured to heat and/or boil water by recovering heat from flue gas.

In a circulating fluidized bed boiler (FIG. 1a), bed material is conveyed from an upper part of the furnace 50 to the cyclone 40 in order to separate the bed material from gases. From the cyclone 40, the bed material falls through a channel 60 to a loopseal 5. In the loopseal 5, a layer of bed material is formed. The bed material is returned from the loopseal 5 to the furnace 50 via a pipeline 15 configured to convey bed material from the loopseal 5 to the furnace 50. In the loopseal 5, the walls 51 of the loopseal 5 limit a volume V into which a fluidized bed of the circulating bed material is arranged. In a bubbling fluidized bed boiler (FIG. 1b), the bed material is fluidized in the furnace 50. Thus, the walls 51 of the furnace 50 limit a volume V into which a fluidized bed of the bed material is arranged.

In general, a fluidized bed boiler 1 comprises piping for heat transfer medium. In use, the heat transfer medium circulates in the piping and becomes heated by heat exchangers, in particular the flue gas heat exchangers 26, 28 and the fluidized bed heat exchanger 10. The piping forms a circulation for heat transfer medium. In the circulation, the same heat transfer medium may flow in between the flue gas heat exchangers 26, 28 and the fluidized bed heat exchanger 10. Typically the circulation is formed such that the heat transfer medium is first heated in the economizers 28 and thereafter in the superheaters 26. Moreover, after the superheaters 26, the heat transfer medium is heated in the fluidized bed heat exchanger 10. Thereafter, the heat transfer medium, e.g. superheated steam, is typically conveyed to a steam turbine.

The present invention relates in particular to a structure of a coaxial heat transfer tube and a method for manufacturing such a coaxial tube. In use, the coaxial heat transfer tube may be arranged as a part of a heat exchanger. In a preferably use, the heat exchanger is arranged in a fluidized bed, such as in the loopseal 5 of a circulating fluidized bed boiler or in the furnace of a bubbling fluidized bed boiler. In general, a heat exchanger comprises a number of tubes, in which a first heat transfer medium, such as water and/or steam, is configured to flow. Outside the tubes, second heat transfer medium, such as bed material, is configured to flow, whereby heat is transferred from the second heat transfer medium to the first heat transfer medium through a wall of the tube. The heat exchanger 10, which, when installed in a fluidized bed, forms a fluidized bed heat exchanger 10, can be manufactured as a part boiler or as a spare part for the boiler. In addition, the coaxial heat transfer tube 100 can be manufactured as a spare part for the heat exchanger 10 or as a part of a heat exchanger 10. A fluidized bed heat exchanger 10 can be manufactured by assembling several coaxial heat transfer tubes 100 together. Thus, an embodiment concerns a coaxial heat transfer tube 100. In addition, an embodiment concerns a heat exchanger 10. In addition, an embodiment concerns fluidized bed boiler 1.

In this description, the following terms are used:

A heat transfer tube refers to a tube. The heat transfer tube may be made from only one substantially homogeneous material, e.g. metal, such as steel. When considered feasible a heat transfer tube may is referred to as a "plain heat transfer tube" to distinct from a "coaxial heat transfer tube". A plain heat transfer tube may consist of some metal, since metals in general conduct heat well.

A coaxial heat transfer tube refers to an arrangement of tubes, in which an outer heat transfer tube radially surrounds an inner heat transfer tube. A coaxial heat transfer tube is an arrangement of tubes (typically only two tubes), which are mutually coaxial (see FIGS. 2a, 3a, and 3b).

A straight part refers to such a part of a heat transfer tube (plain tube or coaxial tube), that has been obtained from a tube manufacturer, and has not been bent. Commonly, tube manufacturers supply straight rigid tubes. In terms of a radius of curvature, a radius of curvature $r_s$ (see FIG. 2b) of a central line of the straight part is at least 1 meter (1 m). A radius of curvature $r_s$ of a straight part may be infinite or substantially infinite.

A curved part refers to such a part of a heat transfer tube (plain tube or coaxial tube), that has been bent. In terms of a radius of curvature, a radius of curvature $r_c$ (see FIG. 2b or 2c) of a central line of the curved part is less than 1 meter (1 m). Preferably, a radius of curvature $r_c$ of a curved part is at least three times a diameter of the heat transfer tube (plain or coaxial). In particular, radii of curvature of the plain tubes of a bent coaxial tube are the same, since the central line of the curved part defines the radius of curvature.

Figure 2A:
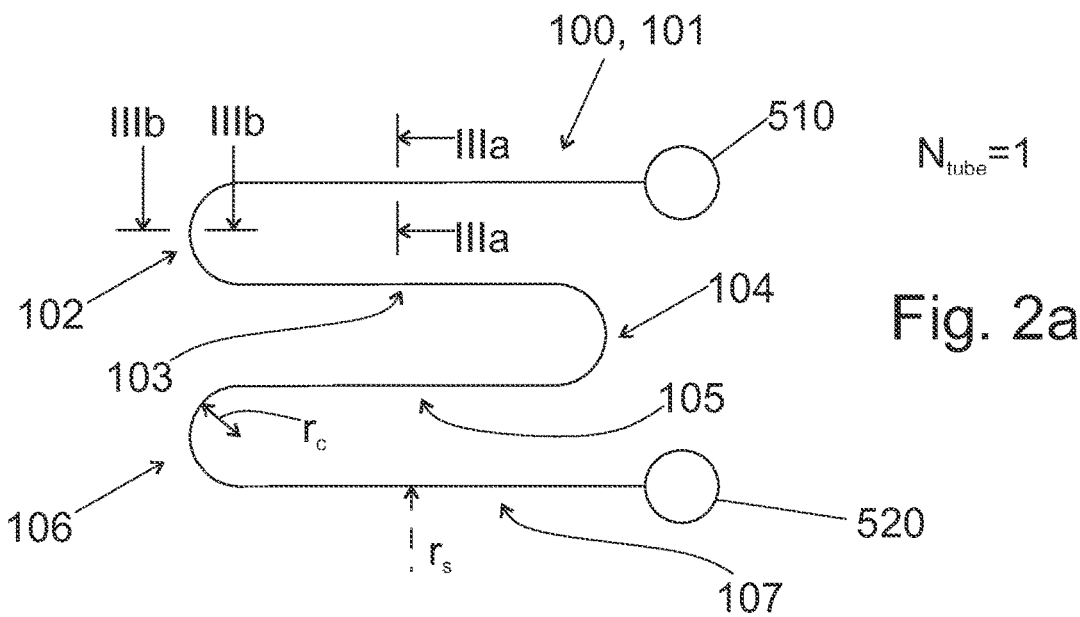
FIG. 2a shows a first coaxial heat transfer tube comprising an inner heat transfer tube and an outer heat transfer tube.

FIG. 2a shows a coaxial heat transfer tube 100, i.e. a first coaxial heat transfer tube 100, according to an embodiment of the invention in a side view. As indicated in FIG. 2a, the first coaxial heat transfer tube 100 comprises a first primary straight part 101, a first primary curved part 102, a first secondary straight part 103, a first secondary curved part 104, a first tertiary straight part 105, and also a further (i.e. tertiary) curved part 106 and a further (i.e. quaternary) straight part 107. Such a tube 100 may form a part of a heat exchanger 10. In FIG. 2a, the direction of flow of fluid transfer medium within the tube in the first primary straight part 101 is reverse to the direction of flow of fluid transfer medium within the tube in the first secondary straight part 103. This is also reverse to the direction of flow of fluid transfer medium within the tube in the first tertiary straight part 105.

Figure 2B:
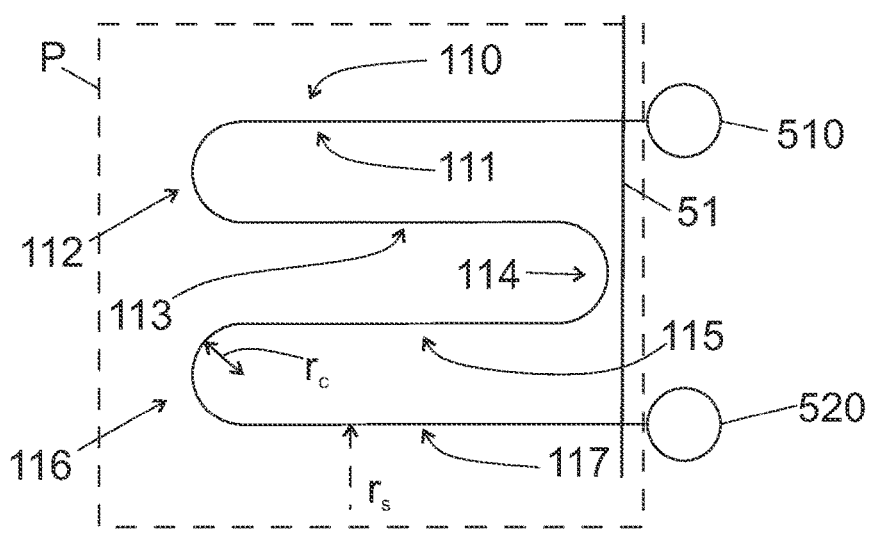
FIG. 2b shows an inner heat transfer tube of the coaxial heat transfer tube of FIG. 2a, FIG. 2c shows an outer heat transfer tube of the coaxial heat transfer tube of FIG. 2a, FIG. 3a shows the sectional view IIIa-IIIa of the coaxial heat transfer tube of FIG. 2a, FIG. 3b shows the sectional view IIIb-IIIb of the coaxial heat transfer tube of FIG. 2a, FIG. 3c shows a part of a spacer arrangement in between inner and outer heat transfer tubes.
Figure 3A:
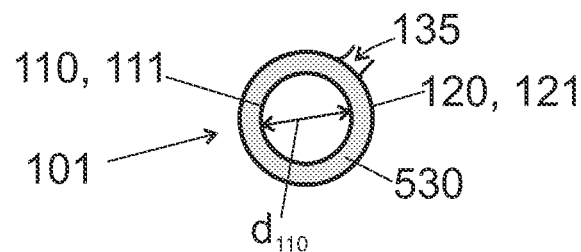
FIG. 3d shows a part of a spacer arrangement in between inner and outer heat transfer tubes.
FIG. 3e shows a part of a spacer arrangement in between inner and outer heat transfer tubes.

Referring to FIGS. 2b and 3a, the first coaxial heat transfer tube 100 comprises a first inner heat transfer tube 110. The first inner heat transfer tube 110 comprises a first primary straight part 111, a first primary curved part 112, a first secondary straight part 113, a first secondary curved part 114, a first tertiary straight part 115, and also a further curved part 116 and a further straight part 117.

Figure 2C:
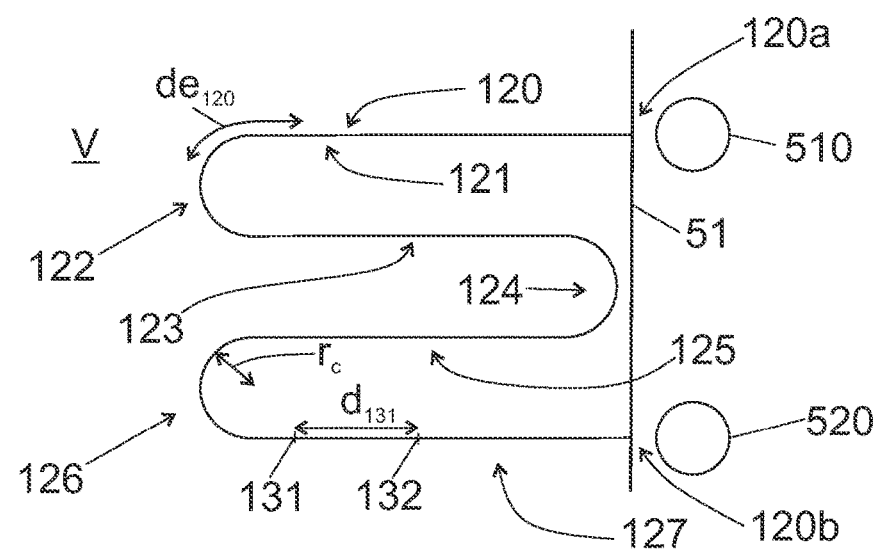

Referring to FIGS. 2c and 3a, the first coaxial heat transfer tube 100 comprises a first outer heat transfer tube 120. The first outer heat transfer tube 120 comprises a first primary straight part 121, a first primary curved part 122, a first secondary straight part 123, a first secondary curved part 124, a first tertiary straight part 125, and also a further curved part 126 and a further straight part 127.

The first outer heat transfer tube 120 radially surrounds at least a part of the first inner heat transfer tube 110. The first outer heat transfer tube 120 radially surrounds at least a part of the first inner heat transfer tube 110 in all radial directions. Thus, at least a part of the first inner heat transfer tube 110 is protected in all radial directions. Moreover, as detailed in connection with a method for manufacturing such a tube 100, the first outer heat transfer tube 120 is formed from one or several tubular pieces of a tube (e.g. plain tube). Therefore, the first outer heat transfer tube 120 does not comprise a longitudinal seam. A longitudinal seam refers to a seam that extends in the longitudinal direction $de_{120}$ (i.e. the direction of extension, FIG. 2c) of the first outer heat transfer tube 120. Correspondingly, a longitudinal seam does not extend fully around the first outer heat transfer tube 120 in a tangential direction of the tube 120, the tangential direction being perpendicular to the longitudinal direction. Thus, at least the first primary curved part 121 of the first outer heat transfer tube 120 is free from (i.e. does not comprise) a longitudinal seam. If the outer tube 120 is made by welding tubular parts together in the longitudinal direction, the outer tube 120 may comprise a transversal seam or several transversal seams. However, this is not preferable from manufacturing point of view. Thus, in an embodiment, the first outer heat transfer tube 120 does not comprise a seam; neither longitudinal nor transversal. In an embodiment, the first inner heat transfer tube 110 does not comprise a seam, i.e. the first inner heat transfer tube 110 is seamless.

When in use, the first outer heat transfer tube 120 radially surrounds the first inner heat transfer tube 110, at least within the space V. However, as indicated in FIG. 2c, outside the space V, the inner heat transfer tube 110 need not be protected by the outer heat transfer tube 120.

Figure 3B:
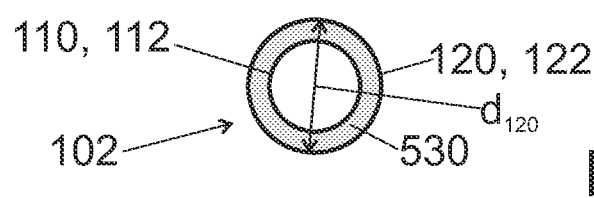

FIG. 3a shows the sectional view IIIa-IIIa of FIG. 2a. As indicated therein, the first outer heat transfer tube 120, in particular the first primary straight part 121 of the first outer heat transfer tube 120, radially surrounds at least a part of the first primary straight part 111 of the first inner heat transfer tube 110. FIG. 3b shows the sectional view IIIb-IIIb of FIG. 2a. As indicated therein, the first outer heat transfer tube 120, in particular the first primary curved part 122 of the first outer heat transfer tube 120, radially surrounds the first primary curved part 112 of the first inner heat transfer tube 110.

Such an arrangement has the technical effect that the curved parts 112, 212, 114, 214, 116, 216 need not be further protected from the fluidized bed material. Therefore, heat can be recovered from the fluidized bed material also in the curved parts. Moreover, as indicated in connection with a method for manufacturing, such a coaxial tube is relatively easy to manufacture.

As known from prior art, the temperature of the outer surface of the outer heat transfer tube 120 should remain reasonably high in order to avoid excessive corrosion. Therefore, the thermal resistance between an inner surface of the inner heat transfer tube 110 and an outer surface of the outer heat transfer tube 120 should be reasonable and preferably substantially constant throughout the coaxial heat transfer tube 100. In other words, a distance d (see FIG. 3c) between an inner surface of the outer heat transfer tube 120 and an outer surface of the inner heat transfer tube 110 should be substantially constant, at least outside spacer arrangements (131, 132). Moreover, some thermally insulating material 530 is arranged in between the tubes 110, 120 to control heat transfer. However, in practice the bending of the coaxial tube to form a bent part has the effect that the spacing is typically not exactly constant throughout the coaxial tube. The spacing may be somewhat decreased on an outer side of a curved part. Another function of thermally insulating material 530 in between the tubes 110, 120 is to help the bending of the tubes 110, 120 such that the distance d does not change much even in the curved parts during bending.

In an embodiment, the distance d is constant within the straight parts (101, 103, 105) and outside spacer arrangements (131, 132). Thus, in an embodiment, the distance d is the same regardless of the point of observation within a straight part, except for a spacer arrangement or spacer arrangements (131, 132), if present. The distance d may be e.g. from 0.3 mm to 5 mm, such as from 1 mm to 4 mm, preferably from 1 mm to 2 mm. The distance d at a straight part, except for a spacer arrangement or spacer arrangements, may be constant and e.g. from 0.5 mm to 5 mm, such as from 1 mm to 4 mm, preferably from 1 mm to 2 mm. Since the tubes 110, 120 of the coaxial tube 100 are coaxial, the distance d is constant within a cross section of the coaxial tube. In addition, also within a curved part 102, a distance d between the tubes may be e.g. from 0.3 mm to 5 mm, such as from 1 mm to 4 mm, preferably from 1 mm to 2 mm.

The first inner heat transfer tube 110 should withstand a reasonably high temperature and a high pressure. To quantify this, the first inner heat transfer tube 110 should withstand a pressure difference of 100 bar between the inner and outer surface of the tube 110 at a temperature of 500° C. More preferably, first inner heat transfer tube 110 should withstand a pressure difference of 150 bar between the inner and outer surface of the tube 110 at a temperature of 600° C. For these reasons, in an embodiment, the first inner heat transfer tube 110 comprises steel, preferably ferritic steel or austenitic steel. In an embodiment, a thickness of a wall of the first inner heat transfer tube 110 is at least 3 mm, such as from 3 mm to 10 mm.

The first outer heat transfer tube 120 needs not withstand such a high pressure. Therefore, in an embodiment, a thickness of a wall of the first inner heat transfer tube 110 is greater than a thickness of a wall of the first outer heat transfer tube 120. However, the first outer heat transfer tube 120 need to withstand a higher temperature than the first inner heat transfer tube 110; because of the thermal insulator 530 in between the tubes. Therefore, in an embodiment, the first outer heat transfer tube 120 comprises steel, preferably austenitic steel. Moreover, because of thermal expansion of the tubes 110, 120 in use, preferably, the first outer heat transfer tube 120 and the first inner heat transfer tube 110 are made of same material, e.g. austenitic steel.

Referring to FIGS. 3a and 3b, solid, e.g. hardened, thermally insulating material 530 has been arranged in between the first inner heat transfer tube 110 and the first outer heat transfer tube 120. The material 530 has been arranged [i] in between the first primary straight part 111 of the first inner tube 110 and the first primary straight part 121 of the first outer tube 120 and [ii] in between the first primary curved part 112 of the first inner tube 110 and the first primary curved part 122 of the first outer tube 120.

Regarding both straight and curved parts, the thermal conductivity of the thermally insulating material 530 should be sufficiently high to recover heat by the coaxial tube 100. Moreover, the thermal conductivity should be sufficiently low to keep the temperature of the outer surface of the coaxial tube sufficiently high in use. Preferably, the thermal conductivity of the thermally insulating material 530 is from 1 W/mK to 10 W/mK at 20° C. Moreover, the thermally insulating material 530 should be resistant to heat in order to withstand high operating temperatures. Therefore, in an embodiment, the thermally insulating material 530 is heat resistant at least up to 1000° C. Regarding the curved part(s) a function of the thermally insulating material 530 is to act as a mechanical support during bending of the coaxial tube 100. Thus, when hardened, the thermally insulating material 530 should have a reasonably high Young's modulus in order not to be compressed. In an embodiment, a Young's modulus of the thermally insulating material 530 of the coaxial tube 100 is at least 1 GPa at a temperature of 20° C. In an embodiment, a Young's modulus of the thermally insulating material 530 of the coaxial tube 100 is at least 5 GPa at a temperature of 20° C.

A coaxial heat transfer tube 100 can be manufactured by inserting at least a part of an inner tube 110 into an outer tube 120 such that the outer tube 120 radially surrounds the part of the inner tube 110. Moreover, the inner tube 110 extends at least through the outer tube 120 from one end 120a of the outer tube 120 to another end 120b of the outer tube 120 (see FIGS. 2a to 2c). In this way, a straight coaxial heat transfer tube is formed. Thereafter, thermally insulating material 530 is arranged in between the tubes 110, 120. In an embodiment, the thermally insulating material 530 is hardenable and also injectable before hardening. Thus, in an embodiment, the thermally insulating material 530 is injected in between the tubes 110, 120. Thereafter, the thermally insulating material 530 may be hardened (e.g. dried) to make the material sufficiently hard for it to act as a mechanical support, as indicated above. Hardening may be done at a temperature of from 100° C. to 400° C. Last, the straight coaxial heat transfer tube is bent at suitable locations to a suitable radius of curvature. Preferably, the straight coaxial tube is bent at such a temperature that the temperature of the tubes 110, 120 is below 300° C., such as below 200° C. The temperature at which the straight tube is bent may be at least −50 ° C., such as, for example from 0° C. to 50° C., such as substantially room temperature.

Because of said bending, the inner and outer tubes 110, 120 (i.e. the plain tubes) should be made of bendable material, i.e. ductile material. Suitable materials include many metals, in particular steel, such as ferritic steel or austenitic steel.

It has been found that a ratio $r_c/d_{120}$ of the radius of curvature $r_c$ of a bent (i.e. curved) part of the coaxial heat transfer tube 100 to an outer diameter $d_{120}$ of the first coaxial heat transfer tube 100 is preferably at least 3. This has the effect that the distance between the tubes 110, 120 remains substantially constant during bending. More preferably, the ratio $r_c/d_{120}$ is at least 3.3, such as at least 3.5.

It has also been found that a ratio $r_c/d_{110}$ of the radius of curvature $r_c$ of a bent (i.e. curved) part of the coaxial heat transfer tube 100 to an outer diameter duo of the first inner heat transfer tube 110 is preferably at least 3. This has the effect that the capability of the inner heat transfer tube 110 to withstand high pressures remains substantially unchanged during bending the coaxial tube 100. More preferably, the ratio $r_c/d_{110}$ is at least 3.3, such as at least 3.5. Bending the inner heat transfer tube 110 to a small (or smaller) radius of curvature would necessitate post bend heat treatment (PBHT) of the coaxial heat transfer tube 100 and in this way complicate the manufacturing process. Thus, having a reasonably large radius of curvature results in a simpler manufacturing process.

The thermally insulating material 530 may be fed in between the tubes 110, 120 from an end (120a, 120b) of the outer heat transfer tube 120. In addition or alternatively, an orifice 135 (see FIG. 3a) may be formed to the outer heat transfer tube 120, and the thermally insulating material 530 may be injected in between the tubes 110, 120 via the orifice. The orifice may be later closed. Thus, in an embodiment, the first outer heat transfer tube 120 comprises an orifice 135, which may be closed, though which the thermally insulating material 530 has been fed (e.g. injected) in between the first inner heat transfer tube 110 and the first outer heat transfer tube 120. Injecting through an orifice 135 has the beneficial effect that a higher injection pressure can be used, whereby the injection can be made faster.

Figure 3C:
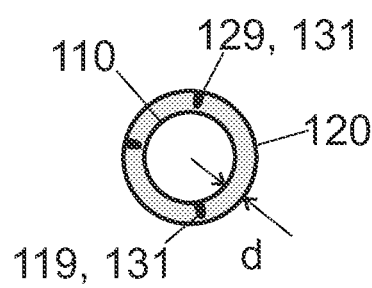

It has been found that centering of the tubes 110, 120 may be hard, since neither of them is naturally infinitely straight. It has been found that the tubes 110, 120 can be centered relative to each other by using at least one spacer arrangement 131. The spacer arrangement 131 is made from solid material different from the thermally insulating material 530. Thus, it has been found that the distance d in between the tubes before bending can be made substantially constant by the first spacer arrangement 131 comprising at least one spacer element (119, 129). The first spacer arrangement 131 is configured to define a constant distance d between an inner surface of the first outer heat transfer tube 120 and an outer surface of the first inner heat transfer tube 110 at a location of a straight part (101, 111, 121, 103, 113, 123) of the tube 100. In effect, the first spacer arrangement 131 is configured to align the inner tube 110 and the outer tuber 120 in such a way that they are parallel and coaxial. Referring to FIG. 3c, a protrusion 129 on the inner surface of the first outer heat transfer tube 120 may serve as one of the spacer elements of the spacer arrangement. In an embodiment, protrusions 129 on the inner surface of the first outer heat transfer tube 120 serve as (at least some of) the spacer elements of the spacer arrangement.

In addition or alternatively, a protrusion 119 (see FIG. 3c) on the outer surface of the first inner heat transfer tube 110 may serve as one of the spacer elements of the spacer arrangement. Such a protrusion may be e.g. welded on the outer surface of the first inner heat transfer tube 110. In an embodiment, protrusions 119 on the outer surface of the first inner heat transfer tube 110 serve as (at least some of) the spacer elements of the spacer arrangement. However, since the inner heat transfer tube 110 needs to withstand a high pressure at a high temperature, preferably the outer surface of the first inner heat transfer tube 110 is free from protrusions 119. Thus, preferably a spacer arrangement 131 consists of protrusions 129 on the inner surface of the first outer heat transfer tube 120.

Referring to FIG. 3c, the first spacer arrangement 131 comprises at least three protrusions 129. Preferably, the first spacer arrangement 131 comprises at most ten protrusions 129. More preferably, the first spacer arrangement 131 comprises from four to eight protrusions 129. The protrusions 129 need not be at a same longitudinal position of the tube 100. Protrusions may be arranged within a length of the first spacer arrangement 131, wherein the length of the first spacer arrangement 131 may be e.g. at most 100 mm.

In an embodiment, the first coaxial heat transfer tube 100 comprises a second spacer arrangement 132. Also the second spacer arrangement 132, in combination with the first spacer arrangement 131, is configured to align the inner tube 110 and the outer tuber 120 in such a way that they are parallel and coaxial. Also the second spacer arrangement is made from solid material other than the thermally insulating material 530. Referring to FIG. 2c, preferably a distance $d_{131}$ in between the first spacer arrangement 131 and the second spacer arrangement 132 is from 100 mm to 2000 mm along the first coaxial heat transfer tube 100. The distance $d_{131}$ should not be too large in order to center the tubes 110, 120 relative to each other. Moreover distance $d_{131}$ should not be too small to have a suitable heat insulating property in between the tubes 110, 120. Preferably, the distance $d_{131}$ is from 300 mm to 1000 mm.

Figure 3D:
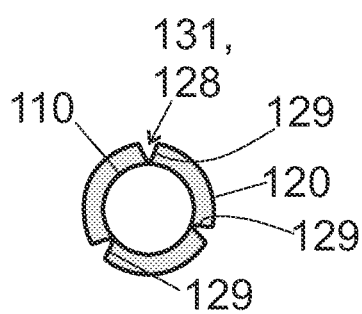
Figure 3E:
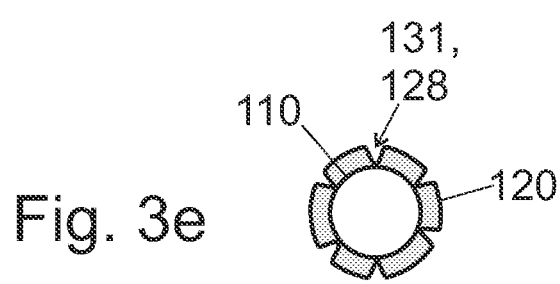

A protrusion 129 may be made on an inner surface of the outer heat transfer tube 120 e.g. by punching a blind hole 128 onto the outer surface of the outer heat transfer tube 120, whereby the outer heat transfer tube 120 will be locally bent to form the protrusion 129 on the inner surface of the outer tube 120, as indicated in FIG. 3d. Such bending occurs at least when the outer heat transfer tube 120 comprises metal, e.g. ductile metal, e.g. steel, such as austenitic steel. In general, a metal suitable for the purpose has a melting point of at least 1000° C. Thus, in an embodiment, the outer heat transfer tube 120 comprises one of these materials. In an embodiment, the first outer heat transfer tube 120 (and optionally also a second outer heat transfer tube 220) comprises blind holes 128 on its outer surface. In particular, referring to FIGS. 3d and 2c, such blind hole 128 and corresponding projections 129 (i.e. a first spacer arrangement 131) is arranged in between a first end 120a of the first outer heat transfer tube 120 and a second end 120b of the first outer heat transfer tube 120 in a direction $de_{120}$ of extension of the first outer heat transfer tube 120. The first space arrangement 131 (such as the blind hole 128 corresponding to the projections 129) may arranged e.g. at least 50 mm or at least 150 mm apart from both the ends 120a, 120b of the first outer heat transfer tube 120. Therefore, an embodiment of the method comprises punching blind holes 128 onto the outer surface of the outer heat transfer tube 120 such that protrusions 129 are formed on the inner surface of the outer tube 120. Such protrusions 129 form a first spacer arrangement 131. Preferably, the blind holes 128 are punched [i] after arranging at least a part of the inner tube 110 into the outer tube 120 and [ii] before arranging (e.g. injecting) the thermally insulating material 530 in between the tubes 110, 120. It may be possible to provide the projections 129 of the outer tube 120 and/or the projections 119 of the inner tube 110 before arranging the inner tube 110 into the outer tube 120.

It has been noticed that a spacer arrangement 131, 132, if used at such a part of the tube 100 that is bent, will easily deteriorate the mechanical properties of the inner tube 110 during bending. Therefore, preferably no spacer arrangement 131, 132 is arranged in a curved part of the coaxial tube 100. Consequently, in an embodiment, such a curved part of the coaxial heat transfer tube 100, of which central axis' radius of curvature is less than 1 m, does not comprise a spacer arrangement (131, 132). However, as indicated above, the thermally insulating material 530 defines a space in between the tubes 110, 120; and the material 530 is used also within the curved parts. Thus, preferably, a curved part of the coaxial heat transfer tube 100, does not comprise a spacer arrangement other than the thermally insulating material 530, which spacer arrangement (131, 132) is configured to define a distance d between an inner surface of the first outer heat transfer tube 120 and an outer surface of the first inner heat transfer tube 110 at least at a straight part (101, 103) of the tube 100. Thus, the blind holes 128 may be punched only to such parts of the tube 100 that will remain straight after said bending. Correspondingly, an embodiment comprises bending only such part/parts of the tube 100 that is/are free from a spacer arrangement. Moreover, in an embodiment, the first coaxial heat transfer tube 100 comprises blind holes 128, but comprises blind holes 128 only at a straight part or straight parts of the coaxial tube 100.

A heat exchanger 10, e.g. a fluidized bed heat exchanger 10, comprises the first coaxial heat transfer tube 100. Moreover, at least a part of the fluidized bed heat exchanger 10, is arranged, in a preferable use, in the space V, to which a fluidized bed is configured to form in use. In an embodiment, both [i] the first primary curved part 122 of the first outer heat transfer tube 120 and [ii] the first primary straight part 121 of the first outer heat transfer tube 120 are configured to contact bed material of the fluidized bed in use.

Having a coaxial heat transfer tube 100 with an inner tube 110 and an outer tube 120, which is coaxial with the inner tube 110, has several beneficial effects as indicated e.g. in U.S. Pat. No. 9,371,987. Not having a separate protective vessel for the curved parts of the coaxial heat transfer tubes improves heat transfer into the inner heat transfer tube 110.

Referring to FIG. 2b, and in accordance with the definition given above, in an embodiment, a radius of curvature $r_s$ of a central line of the first primary straight part 111 of the first inner heat transfer tube 110 is at least 1 m. In addition or alternatively, a radius of curvature $r_c$ of a central line of the first primary curved part 112 of the first inner heat transfer tube 110 is less than 1 m. Referring to FIG. 2a, the definition given above, may apply also to the first coaxial heat transfer tube 100 comprising the inner tube 110 and the outer tube 120.

Referring to FIG. 2b, in an embodiment the tube 100 is bent in such a manner that at least the straight parts of the first coaxial heat transfer tube 100 are arranged to extend within a plane P. In an embodiment, the first primary straight part 101 and the first secondary straight part 103 extend within the plane P. Moreover, in an embodiment wherein the first coaxial heat transfer tube 100 comprises a first tertiary straight part 105, also the first tertiary straight part 105 extends within the plane P. This applies also to both the inner tube 110 and the outer tube 120 and their parts 111, 113, 115 and 121, 123, 125, as indicated in FIGS. 2a to 2c.

Referring to FIG. 2a, in an embodiment, a heat exchanger 10 (and/or the fluidized bed boiler 1) comprises the first coaxial heat transfer tube 100, a distributor header 510 configured to feed heat transfer medium to the first coaxial heat transfer tube 100, in particular the inner heat transfer tube 110 thereof; and a collector header 520 configured to collect heat transfer medium from the first coaxial heat transfer tube 100, in particular the inner heat transfer tube 110 thereof. As indicated above and in FIG. 2a, the first coaxial heat transfer tube 100 (in particular the inner heat transfer tube 110 thereof) extends from the distributor header 510 to the collector header 520. The outer tube 120 needs not to extend from the distributor header 510 to the collector header 520, as indicated in FIG. 2c.

If only one coaxial heat transfer tube 100 with straight and curved parts is used, in order to have a reasonably large heat transfer surface within a reasonably small volume, the tube 100 should be bent to a reasonably small radius of curvature at several locations. Having a small radius of curvature would bring the straight parts 101, 103 close to each other (see FIG. 2a).

However, as indicated above, for manufacturing reasons, preferably a radius of curvature of a curved part is not too small. Therefore, a distance between two straight parts of a coaxial tube, such as the parts 101, 103 of FIG. 2a, is in practice reasonably large. In order to diminish the distance between the heat transfer tubes, and in this way increase the heat transfer surface within a volume, it has been found that at least two coaxial tubes side by side within such a plane that a part a second coaxial tube is left in between two parts of a first coaxial tube, can be used. In particular, referring to FIG. 4a, the distance between the straight parts 201 and 101 can be made as small as necessary, even if the distance between the straight parts 103 and 101 needs to be reasonably large because of the proper radius of curvature. In this way, the heat transfer surface per volume obtainable by the coaxial tubes of FIG. 4a is much larger than with the coaxial tube of FIG. 2a.

It has also been found that the optimal number of coaxial heat transfer tubes arranged side by side is at least two, such as two (FIG. 4a), three (FIG. 5a), four (FIG. 5b), five (not shown), or six (not shown), even if the number may be only one (FIG. 2a).

Figure 4A:
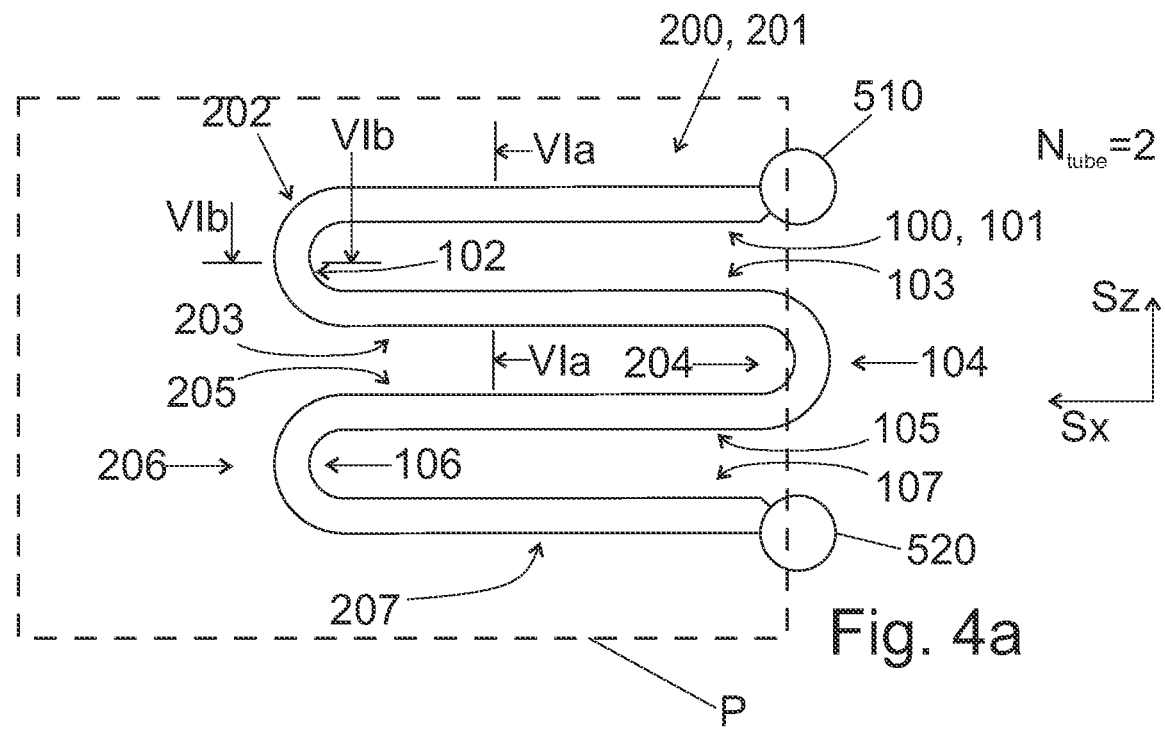
FIG. 4a shows a first coaxial heat transfer tube and a second coaxial heat transfer tube, which both comprise an inner heat transfer tube and an outer heat transfer tube.

As indicated in FIGS. 2a and 4a the first primary curved part (102, 112, and 122, of the first coaxial tube 100 and its plain tubes 110, 120) connects the first primary straight part (101, 111, and 121, respectively) to the first secondary straight part (103, 113, and 123, respectively). Thus, the first primary curved part (102, 112, and 122, respectively) is arranged along the first (coaxial or plain) heat transfer tube (100, 110, and 120, respectively) in between the first primary straight part (101, 111, and 121, respectively) and the first secondary straight part (103, 113, and 123, respectively). Herein the term "along" refers the direction in which the heat transfer medium is configured to flow in the first (coaxial or plain) heat transfer tube (100, 110, and 120).

Figure 6A:
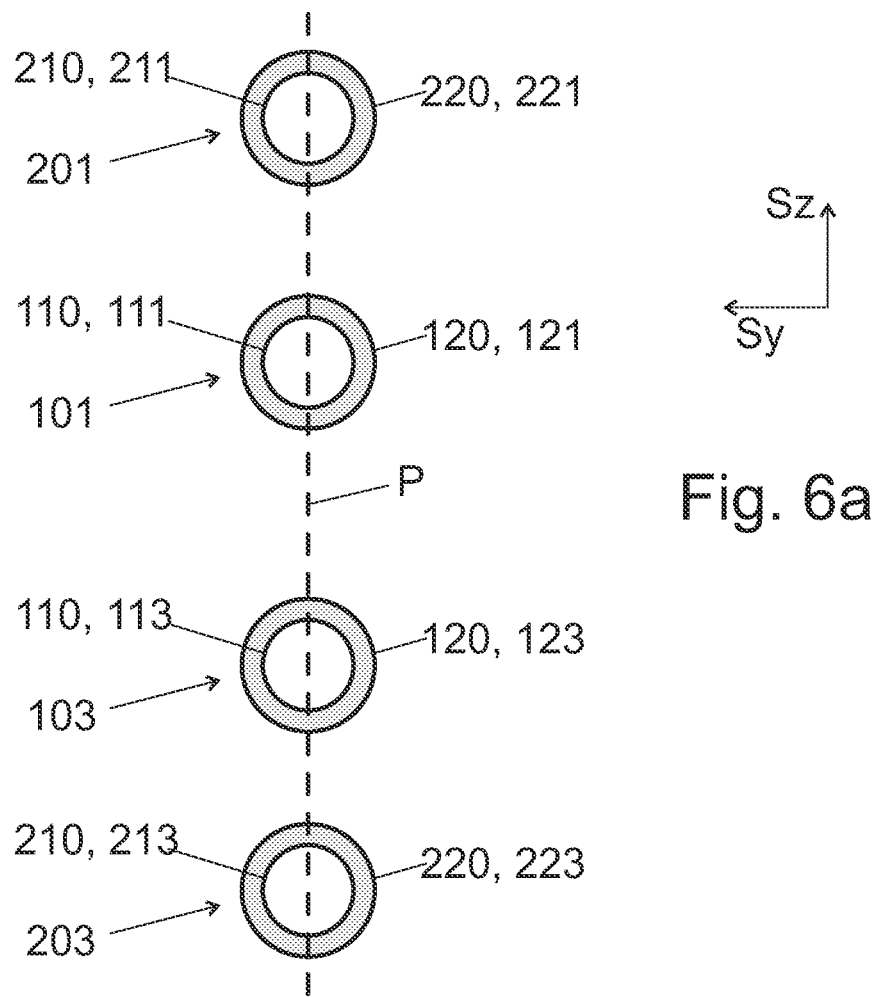
Figure 6B:
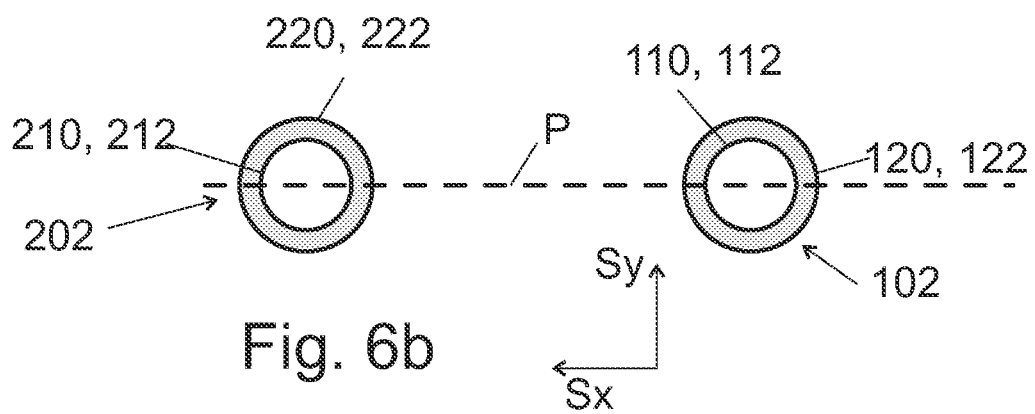

Referring to FIGS. 4a, 6a, and 6b in an embodiment, a heat exchanger 10 further comprises a second coaxial heat transfer tube 200 having a second inner heat transfer tube 210 and a second outer heat transfer tube 220. The second coaxial heat transfer tube 200 extends from the distributor header 510 to the collector header 520. Moreover, with reference to FIGS. 6a and 6b, the second coaxial heat transfer tube 200 comprises

- a second primary straight part 201 having a second primary straight part 211 of a second inner tube 210 and a second primary straight part 221 of a second outer tube 220,
- a second secondary straight part 203 having a second secondary straight part 213 of the second inner tube 210 and a second secondary straight part 223 of a second outer tube 220, and
- a second primary curved part 202 having a second primary curved part 212 of the second inner tube 210 and a second primary curved part 222 of the second outer tube 220.

As indicated in FIG. 4a, the second primary curved part (202, 212, and 222, of the second coaxial tube 200 and its plain tubes 210, 220) connects the second primary straight part (201, 211, and 221, respectively) to the second secondary straight part (203, 213, and 223, respectively). Thus, the second primary curved part (202, 212, and 222, respectively) is arranged along the second (coaxial or plain) heat transfer tube (200, 210, and 220) in between the second primary straight part (201, 211, and 221, respectively) and the second secondary straight part (203, 213, and 223, respectively). Herein the term "along" refers the direction in which the heat transfer medium is configured to flow in the second (coaxial or plain) heat transfer tube (200, 210, and 220).

A limiting radius of curvature for a curved part and a straight part has been defined above. This applies both to the first coaxial tube 100 and the second coaxial tube 200.

Figure 4B:
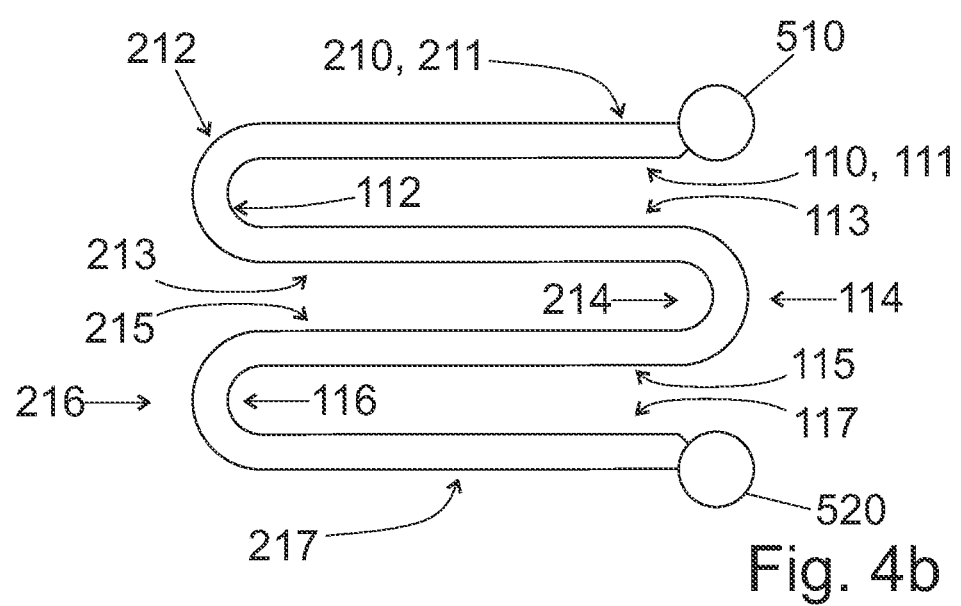
FIG. 4b shows inner heat transfer tubes of the coaxial heat transfer tubes of FIG. 4a, FIG. 4c shows outer heat transfer tubes of the coaxial heat transfer tubes of FIG. 4a, FIG. 5a shows a first coaxial heat transfer tube, a second coaxial heat transfer tube, and a third coaxial heat transfer tube.
Figure 4C:
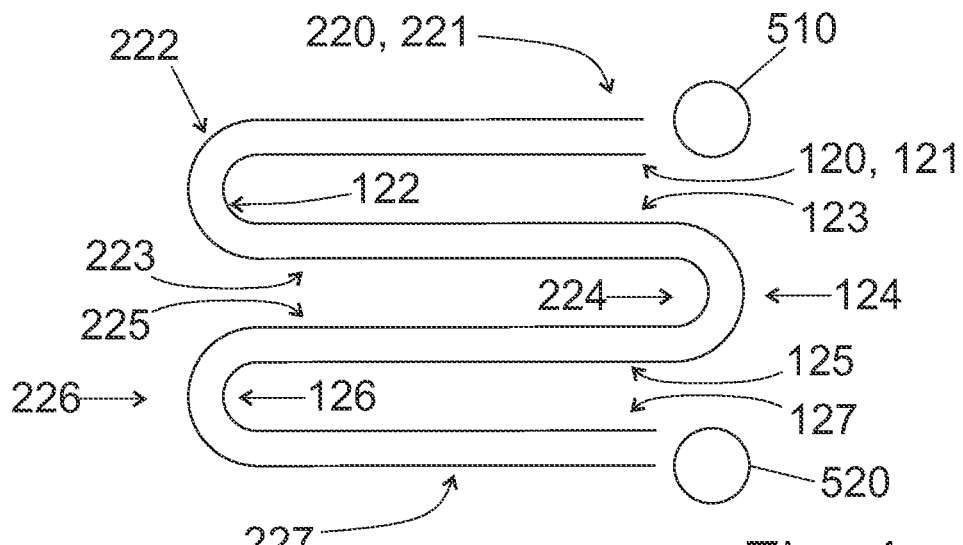

Referring to FIG. 4a, in an embodiment, the first coaxial heat transfer tube 100 and the second coaxial heat transfer tube 200 are arranged relative to each other such that the first primary straight part 101 is arranged in between the second primary straight part 201 and the second secondary straight part 203. This applies also to the straight parts 111, 211, and 213 of the inner tubes (110, 120) as well as to the straight parts 121, 221, and 223 of the outer tubes (120, 220), as indicated in FIGS. 4a to 4c. As indicated above, this has the technical effect that a reasonably high heat transfer surface of the coaxial heat transfer tubes can be provided in a reasonably small space V without using excessively bent tubes (i.e. curved parts with small radii of curvature). This simplifies manufacturing of a coaxial tube (100, 200).

As defined above, the term "coaxial heat transfer tube" refers to an arrangement of tubes that are arranged coaxially. Therefore, in this context, the different coaxial heat transfer tubes (100, 200) are not mutually co-axial. Thus, in an embodiment, no parts of the first coaxial heat transfer tube 100 are coaxial with a part of the second coaxial heat transfer tube 200. It is noted that a similar arrangement of two heat transfer tubes can be used in other applications wherein a high area in a small volume is needed, regardless of the heat transfer tubes of that application being coaxial or plain.

The distributor header 510 is configured to the feed heat transfer medium to the first coaxial heat transfer tube 100, in particular the first inner tube 110, and the second coaxial heat transfer tube 200, in particular the second inner tube 210. In a similar manner, the collector header 520 is configured to collect the heat transfer medium from the first coaxial heat transfer tube 100, in particular the inner tube 110 and the second coaxial heat transfer tube 200, in particular the second inner tube 210. As is evident, the heat transfer medium becomes heated as is flows through the coaxial heat transfer tubes 100, 200 from the distributor header 510 to the collector header 520.

Figure 5A:
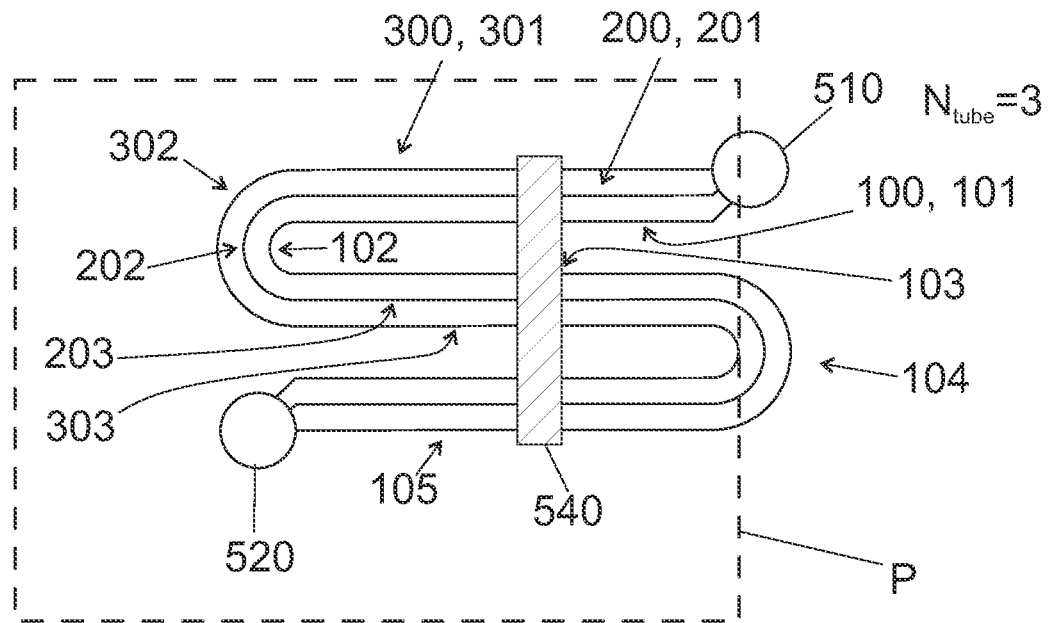
FIG. 5b shows a first coaxial heat transfer tube, a second coaxial heat transfer tube, a third coaxial heat transfer tube, and a fourth coaxial heat transfer tube.
FIG. 5c shows coaxial heat transfer tubes, wherein a radius of curvature of a curved part is not constant.
FIG. 5d shows coaxial heat transfer tubes.
Figure 5B:
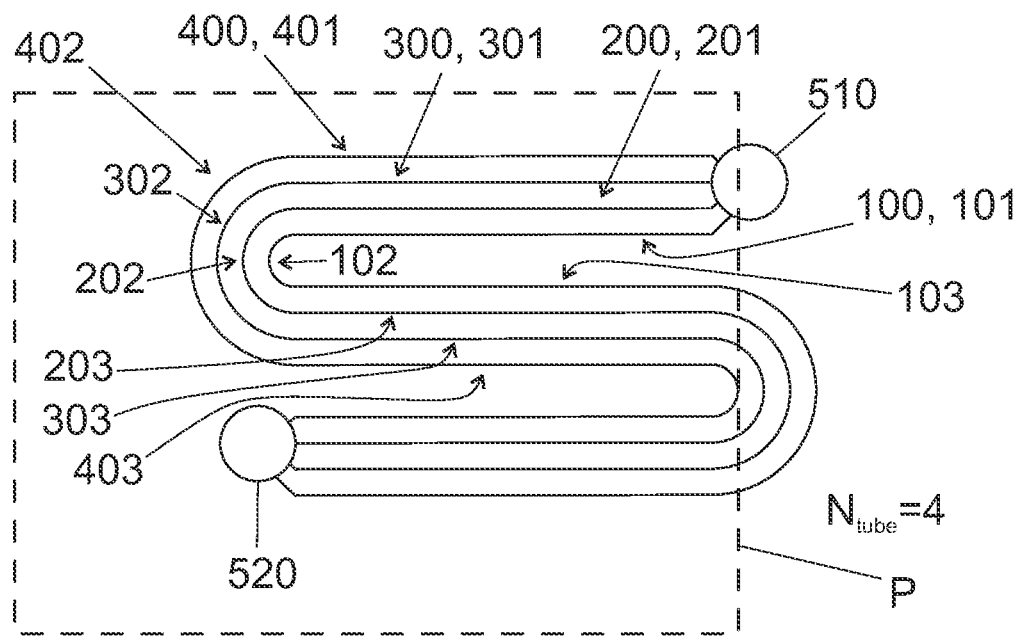

Referring to FIG. 2a, in an embodiment a number $N_{tube}$ of coaxial heat transfer tubes extending within a same plane P from the distributor header 510 to the collector header 520 may be only one, since only the first coaxial tube 100 is present. However, referring to FIG. 4a, in an embodiment the number $N_{tube}$ of coaxial heat transfer tubes extending within a same plane P from the distributor header 510 to the collector header 520 may be two, since also a second coaxial tube 200 is present. Referring to FIG. 5a, the heat exchanger 10 may comprise a third coaxial heat transfer tube 300 extending within the same plane P from the distributor header 510 to the collector header 520. Thus, the number $N_{tube}$ may be three. Referring to FIG. 5b, the heat exchanger 10 may comprise a fourth coaxial heat transfer tube 400 extending within the same plane P from the distributor header 510 to the collector header 520. Thus, the number $N_{tube}$ may be four. Even if not shown, the number $N_{tube}$ may be five, six, or more than six. Referring to FIG. 5a, if needed, the coaxial tubes 100, 200, 300 may be bound together with a binder 540. The binder 540 improves mechanical stability of a heat exchanger 10. Preferably, number $N_{tube}$ of coaxial heat transfer tubes extending within a same plane P is at least two or at least three.

In an embodiment, the fluidized bed boiler 1 or the fluidized bed heat exchanger 10 thereof comprises a number $N_{tube}$ of such coaxial heat transfer tubes (100, 200, 300, 400) that [i] extend from the distributor header 510 to the collector header 520 and [ii] comprise at least a primary straight part (101, 201, 301), a secondary straight part (103, 203, 303), and a primary curved part (102, 202, 302), which connects the primary straight part of the tube in question to the secondary straight part of the tube in question.

Referring to FIG. 5a in an embodiment the number $N_{tube}$ is three. Such embodiment comprises the first and second coaxial heat transfer tubes 100, 200, as discussed above. Furthermore in that embodiment, the fluidized bed boiler 1 or the heat exchanger 10 suitable for a fluidized bed of the boiler 1, comprises a third coaxial heat transfer tube 300 extending from the distributor header 510 to the collector header 520. The third coaxial heat transfer tube 300 comprises the parts as discussed above for the first and second tubes 100, 200. In an embodiment, the third coaxial heat transfer tube 300 comprises an inner heat transfer tube and an outer heat transfer tube as discussed above in connection with the first coaxial heat transfer tube 100 and/or the second coaxial heat transfer tube 200.

Referring to FIG. 5a, the third coaxial heat transfer tube 300 comprises a third primary straight part 301 and a third secondary straight part 303. The second coaxial heat transfer tube 200 and the third coaxial heat transfer tube 300 are arranged relative to each other such that the second primary straight part 201 is arranged in between the third primary straight part 301 and the third secondary straight part 303. What has been said above about the relative arrangement of the first and second coaxial heat transfer tubes (100, 200) applies. As discussed above, in an embodiment, the first primary straight part 101, the second primary straight part 201, and the second secondary straight part 203, extend within the plane P. When the third coaxial heat transfer tube is present, in an embodiment, also the third primary straight part 301 and the third secondary straight part 303 extend within the plane P.

Referring to FIG. 5b, in an embodiment the number $N_{tube}$ is four. Such embodiment comprises the first, second, and third coaxial heat transfer tubes 100, 200, 300 as discussed above. Furthermore in that embodiment, the fluidized bed boiler 1 or the heat exchanger 10 suitable for a fluidized bed of the boiler 1, comprises a fourth coaxial heat transfer tube 400 that extends from the distributor header 510 to the collector header 520.

Referring to FIG. 4a, in an embodiment, the coaxial heat transfer tubes 100, 200 have more curved parts. This has the effect that a distance between the distributor header 510 and the collector header 520 can be made reasonably large while still having the straight parts of the tubes 100, 200 close to each other. Having the straight parts of the tubes 100, 200 close to each other increases the heat transfer area, which improves the heat recovery. Preferably the straight parts of the tubes are arranged in a same plane P.

Figure 5C:
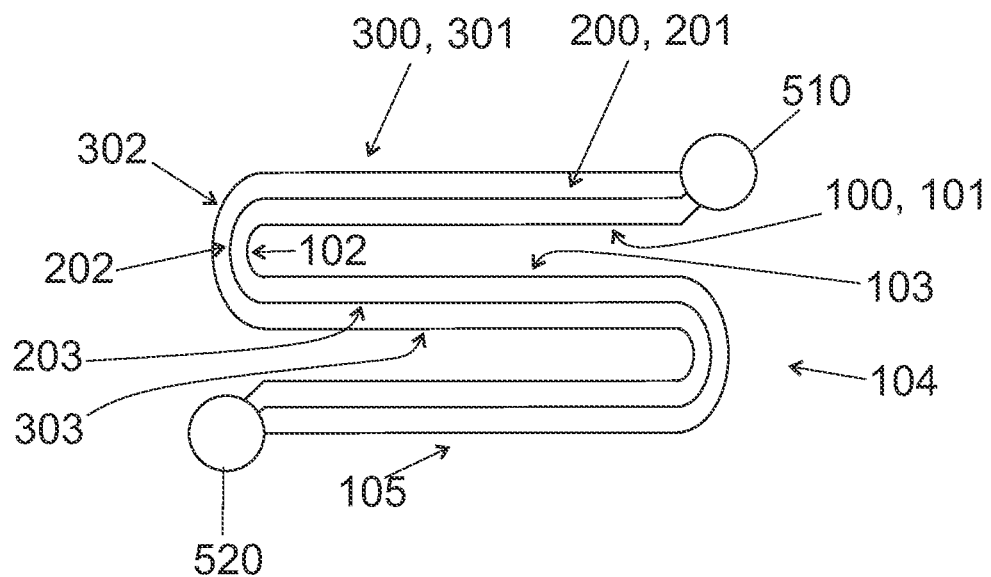
Figure 5D:
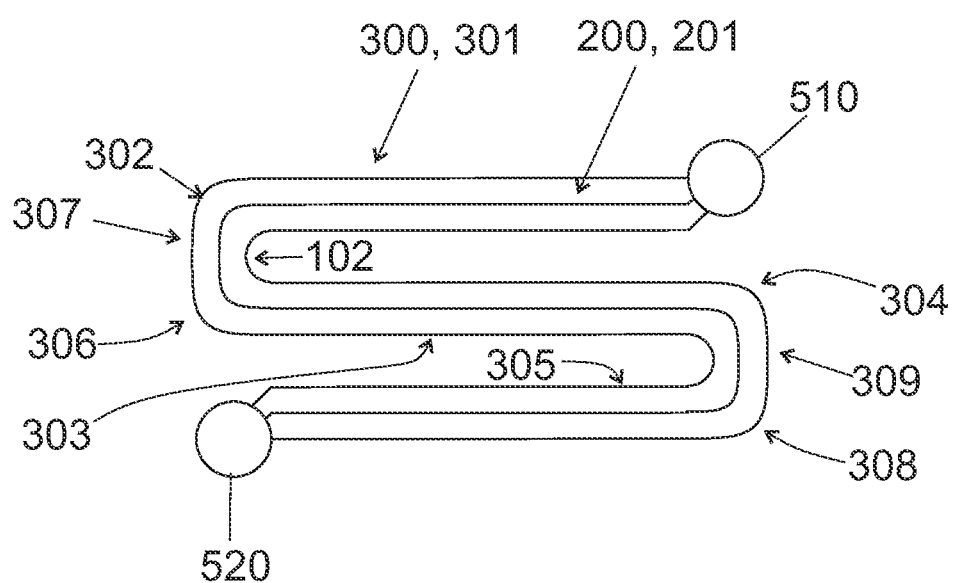

As shown in the figures, the curved parts are preferably such curved parts that the direction of propagation of the heat transfer medium within the tube changes by from 30 to 180 degrees within a curved part. For example FIGS. 2a and 4a show curved parts 102, 202 that change the direction of flow by 180 degrees. For example FIG. 5d shows a curved part 302 that changes the direction of flow by 90 degrees and another curved part 306 that changes the direction of flow by another 90 degrees. In a similar manner a turn of 180 degrees could be made by using more curved parts separated from each other by straight parts. Referring to FIG. 5c, the radius of curvature of a curved part need not to be constant.

Preferably the fluidized bed heat exchanger 10 as disclosed above is used in a loopseal 5 of a circulating fluidized bed boiler. Thus, in an embodiment, the fluidized bed boiler 1 comprises means 40 for separating bed material from flue gas. Referring to FIG. 1a, in an embodiment, the fluidized bed boiler 1 comprises a cyclone 40 for separating bed material from flue gas. The fluidized bed boiler comprises a loopseal 5 configured to receive bed material from the means 40 for separating bed material from flue gas (e.g. from the cyclone). Moreover, at least a part of the fluidized bed heat exchanger 10 is arranged in the loopseal 5. Referring to FIGS. 2b and 2c for example, the distributor header 510 and to collector header 520 may be arranged outside the loopseal. However, at least most of the coaxial heat transfer tubes (100, 200) are arranged in to the loopseal as indicated above. For example, in an embodiment, at least 90% of the coaxial heat transfer tubes (100, 200) of the fluidized bed heat exchanger 10, as measured lengthwise, are arranged in the loopseal 5 as indicated above.

The invention claimed is:

1. A method for manufacturing a coaxial heat transfer tube, the method comprising the steps of:
    arranging an inner heat transfer tube and an outer heat transfer tube,
    inserting at least a part of the inner heat transfer tube into the outer tube such that the inner heat transfer tube extends at least through the outer heat transfer tube to form a straight coaxial heat transfer tube,
    arranging thermally insulating material in between the inner heat transfer tube and the outer heat transfer tube,
    hardening the thermally insulating material at a temperature of 100° C. to 400° C.,
    after hardening the thermally insulating material, bending the straight coaxial heat transfer tube to form a first primary curved part to the coaxial heat transfer tube, and
    before said bending, forming first protrusions on at least one of an inner surface of the outer heat transfer tube or an outer surface of the inner heat transfer tube,
    wherein, after said hardening, a thermal conductivity of the thermally insulating material is from 1 W/mK to 10 W/mK at a temperature of 20° C.

2. The method of claim 1, wherein:
    the forming of the first protrusions occurs by punching blind holes onto an outer surface of the outer heat transfer tube.

3. The method of claim 2, wherein the blind holes are punched only to such parts of the tube that will remain straight after said bending.

4. The method of claim 1, wherein:
    before said hardening, the thermally insulating material is injected in between the inner and outer heat transfer tube; and
    after said hardening:
        a Young's modulus of the thermally insulating material is at least 1 GPa or at least 5 GPa at a temperature of 20° C., and the thermally insulating material is heat resistant at least up to 1000° C.

5. The method of claim 1, comprising the step of bending the straight coaxial heat transfer tube to form a first primary curved part to the coaxial heat transfer tube at such a temperature that the temperature of the inner heat transfer tube and the outer heat transfer tube is below 300° C.

6. The method of claim 1, comprising the step of centering the inner heat transfer tube and the outer heat transfer tube relative to each other by using the first protrusions.

* * * * *